United States Patent
DuPuis

(10) Patent No.: US 7,633,420 B2
(45) Date of Patent: Dec. 15, 2009

(54) PRESSURE SENSOR WITH IMPROVED RATE-OF-CHANGE COMPATIBLE DATA OUTPUT

(75) Inventor: Paul B. DuPuis, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 59 days.

(21) Appl. No.: 12/116,716

(22) Filed: May 7, 2008

(65) Prior Publication Data

US 2009/0278718 A1   Nov. 12, 2009

(51) Int. Cl.
H03M 3/00 (2006.01)
(52) U.S. Cl. ...................... 341/143; 341/155
(58) Field of Classification Search .................. 341/143, 341/155
See application file for complete search history.

(56) References Cited

U.S. PATENT DOCUMENTS

| 5,245,343 | A | | 9/1993 | Greenwood et al. |
| 6,014,022 | A | * | 1/2000 | Demma et al. ......... 324/207.12 |
| 6,170,338 | B1 | | 1/2001 | Kleven et al. |
| 6,658,945 | B1 | | 12/2003 | Kleven |
| 6,674,387 | B1 | | 1/2004 | Ott |
| 6,720,777 | B2 | | 4/2004 | Wang |
| 7,456,770 | B2 | * | 11/2008 | Cairns ........................ 341/143 |
| 7,501,968 | B2 | * | 3/2009 | DuPuis et al. ............... 341/141 |
| 2004/0153229 | A1 | | 8/2004 | Gokturk et al. |

* cited by examiner

Primary Examiner—Khai M Nguyen
(74) Attorney, Agent, or Firm—Fogg & Powers LLC

(57) ABSTRACT

An integrated sensor implementation employs a data acquisition method for producing digital output signals that enables computing low latency, low noise, rate of pressure (or altitude etc.) change measurements. An example sensor includes a self-digitizing pressure and temperature sensor circuit that outputs a serial digital signal that varies with at least one physical parameter to which the sensor circuit is exposed. The sensor incorporates an internal sigma-delta A/D converter and digital data acquisition device that effectively time-stamps all acquired data. This time stamped data is then transmitted to an external processing resource (microprocessor) that is used to convert the self-digitized, time stamped data into low latency, low-noise proportional and rate parameter outputs having the desired engineering units for at least one physical parameter sensed. This low-latency, low noise rate of change signal may be derived without the latency penalty of digital filtering.

13 Claims, 10 Drawing Sheets

PRESSURE SENSOR WITH IMPROVED RATE-OF-CHANGE COMPATIBLE DATA OUTPUT

BACKGROUND OF THE INVENTION

Pressure sensors are generally used in avionics applications to measure the flight-related "air data" parameters of altitude, altitude rate, airspeed, airspeed rate, Mach, Mach rate, and other related parameters based in part on various air pressures measured in flight. These parameters are typically derived from two primary pressure measurements—static pressure, that is indicative of the ambient pressure at the aircraft's flight altitude, and total pressure, that is the summation of the static pressure and a higher pressure induced by the aircraft's forward velocity.

Recent mandates in international flight regulations require aircraft to fly with reduced vertical separation between adjacent flight levels. This vertical separation has been reduced from 2,000 foot spacing down to 1,000 foot spacing for aircraft flying between 29,000 and 41,000 feet above mean sea level. This decrease in spacing enables double the number of aircraft to occupy any given flight corridor at a given time, thereby reducing in-flight traffic delays. It, however, requires aircraft to be controlled more precisely at their assigned altitude to minimize the risk of collision.

Since on-aircraft measurement of the altitude is dependent on precisely measuring static pressure, and to a lesser extent total pressure due to some of the speed-based corrections that are typically applied to correct for airflow anomalies over the static ports, extremely precise, stable, quiet, low latency, high resolution pressure measurements must be accomplished in order to yield the required accuracy. The quietness, latency and resolution of these measurements are essential considerations necessary to provide timely dynamic correction signals to the autopilot for maintaining the assigned altitude, Mach number, and airspeed.

Most air data sensors interface with their processing electronics in a manner where their information is sampled and/or computed at discrete times based on the air data computer's interrupt-based timing loops. Sampling at discrete points in such systems is prone to aliasing of signals above the Nyquist frequency and noise; therefore, prefiltering is necessary to minimize those detrimental effects. Prefiltering, however, adds latency and decreases system responsiveness. Since rate-based calculations such as altitude rate, Mach rate, and airspeed rate are mathematical derivative functions versus time, any jitter in the time of data measurement and its processing by the system's computer becomes the main contributor affecting the quietness and usable resolution of such rate parameter measurements. Traditionally, this noise has been reduced by heavy filtering, again, at the penalty of increased latency.

Although there are many different Integrated Sensor Systems (ISS) in the marketplace, none currently simultaneously provide adequate interface flexibility, measurement capability, long-term stability, and measurement resolution for wide bandwidth, low noise air data and other precision applications. Moreover, many so-called "smart sensors" (those with an internal microcomputer) have inadequate capability to simultaneously perform high accuracy, high resolution pressure measurements at the high measurement rates that may be needed for modern air data and other applications requiring low latency and wide bandwidth.

Hence, there is a need for a precision, environmentally-compatible, integrated sensor system that incorporates a sensor and unique analog to digital conversion and interface circuitry within a single housing and is capable of providing data from which low latency, low noise static pressure and pressure-based rate functions may be externally computed. Furthermore, other desirable features and characteristics of the present invention will become apparent from the subsequent detailed description of the invention and the appended claims, taken in conjunction with the accompanying drawings and this background of the invention.

SUMMARY OF THE INVENTION

In contrast to these prior art implementations, this pressure sensor incorporates all pressure magnitude, temperature and time-related sensing within the sensor package to enable low noise pressure measurements with a related time stamping of each measurement defining the exact instant of acquisition. This enables the system's computer to accurately calculate the desired pressure and rate parameters with the data provided.

This invention represents an expansion of the integrated sensor capabilities described in U.S. patent application Ser. No. 11/639,686 now U.S. Pat. No. 7,501,968 filed 15 Dec. 2006 which is incorporated by reference. The present invention provides an Integrated Sensor System (ISS) having a sensor that provides improved rate-of-change compatible output data in addition to its primary pressure measurement function by embedding a synchronous time stamp with each internal data conversion.

A data conversion and acquisition device embedded within the sensor synchronously stores high resolution measurement parameter magnitude and timing information for each sigma delta integration period in a manner that enables a very low noise rate-of-change parameter to be externally computed with minimal latency. An external processing device (typically a microcomputer) receives the magnitude and timing (phase) output data from this ISS and subsequently computes a rate-of-change signal of at least one of the sensed physical parameters based on the data provided by the sensor.

An example method decouples the timing of the downstream processing (within the microcomputer) from deleteriously affecting the rate of change computation. This is specifically accomplished by embedding both magnitude and time of data acquisition in the integrated sensor's digital output word.

An integrated sensor implementation employs a data acquisition method for producing digital output signals that enables computing low latency, low noise, rate of pressure (or altitude etc.) change measurements. An example sensor includes a self-digitizing pressure and temperature sensor circuit that outputs a serial digital signal that varies with at least one physical parameter to which the sensor circuit is exposed. The sensor incorporates an internal sigma-delta A/D converter and digital data acquisition device that effectively time-stamps all acquired data. This time stamped data is then transmitted to an external processing resource (microprocessor) that is used to convert the self-digitized, time stamped data into low latency, low-noise proportional and rate parameter outputs having the desired engineering units for at least one physical parameter sensed. This low-latency, low noise rate of change signal may be derived without the latency penalty of digital filtering. This system approach also allows a precision rate of change measurement to be easily made over a shorter data acquisition interval. This enables subsequent software-based low-pass filtering, if desired, to be applied at a higher cutoff frequency thus maximizing the frequency response of the rate measurement computation while further reducing its noise.

An example sensor is one that internally utilizes the synchronous pulse density modulation (SPDM) method of Σ-Δ A/D conversion to convert a sensed analog signal into a SPDM pulse train simultaneously acquiring magnitude and timing of said data synchronously in a parallel manner at the exact time of measurement. Providing that magnitude and timing data over a serial I²C or SPI interface to a user device for final conversion into engineering units including rate parameters.

In one aspect of the invention, a sensor includes an internal sigma delta data acquisition system whose output data structure is configured to minimize sensitivity to read timing jitter when making rate-based parameter measurements.

In another aspect of the invention, an integrated sensor system (ISS) includes internal counter-based data acquisition hardware.

In yet another aspect of the invention, an ISS includes packaging that provides electrostatic shielding of the sensor, and noise-sensitive analog and digital data acquisition electronics.

In still another aspect of the invention, an ISS includes packaging that provides inorganic hermetic packaging for environmental protection of the sensor, and associated analog and digital data acquisition electronics.

In still yet another aspect of the invention, an ISS includes internal architecture that enables plug-and-play replaceability of the sensor due to the fact that all critical sensor and data acquisition related error sources are contained within the sensor package and are incorporated into the calibration model.

In a further aspect of the invention, an ISS provides data based on a signal average over a sigma delta integration interval, thereby reducing the potential for aliasing and the effects of noise.

In yet a further aspect of the invention, an ISS provides for variable data acquisition timing versus clock rate.

In still yet a further aspect of the invention, secondary PDM outputs of an ISS are modeled for use with analog interfaces; that modeling being in the form of calibration coefficients stored within the EEPROM and available over the serial interface.

In another aspect of the invention, an ISS has the ability to provide DC outputs from either channel.

In yet another aspect of the invention, an ISS has the ability to independently configure the operational mode of each channel.

In still yet aspect of the invention, an ISS provides inherent autoranging of the inputs measurement resolution without gain-switching a preamplifier.

BRIEF DESCRIPTION OF THE DRAWINGS

The present invention will hereinafter be described in conjunction with the following drawing figures, wherein like numerals denote like elements, and.

DETAILED DESCRIPTION OF THE PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Portions of the following description are not directly the subject of this invention and are covered by a separate application and other referenced patents; they are presented for contextual understanding of how the invention operates.

The following is a detailed description of the system and how it operates, illustrating the insensitivity to external data acquisition timing jitter. First, the hardware implementation is described, then how the hardware operates to capture the data, and lastly the final data reduction process performed external to the sensor.

Figure 1:
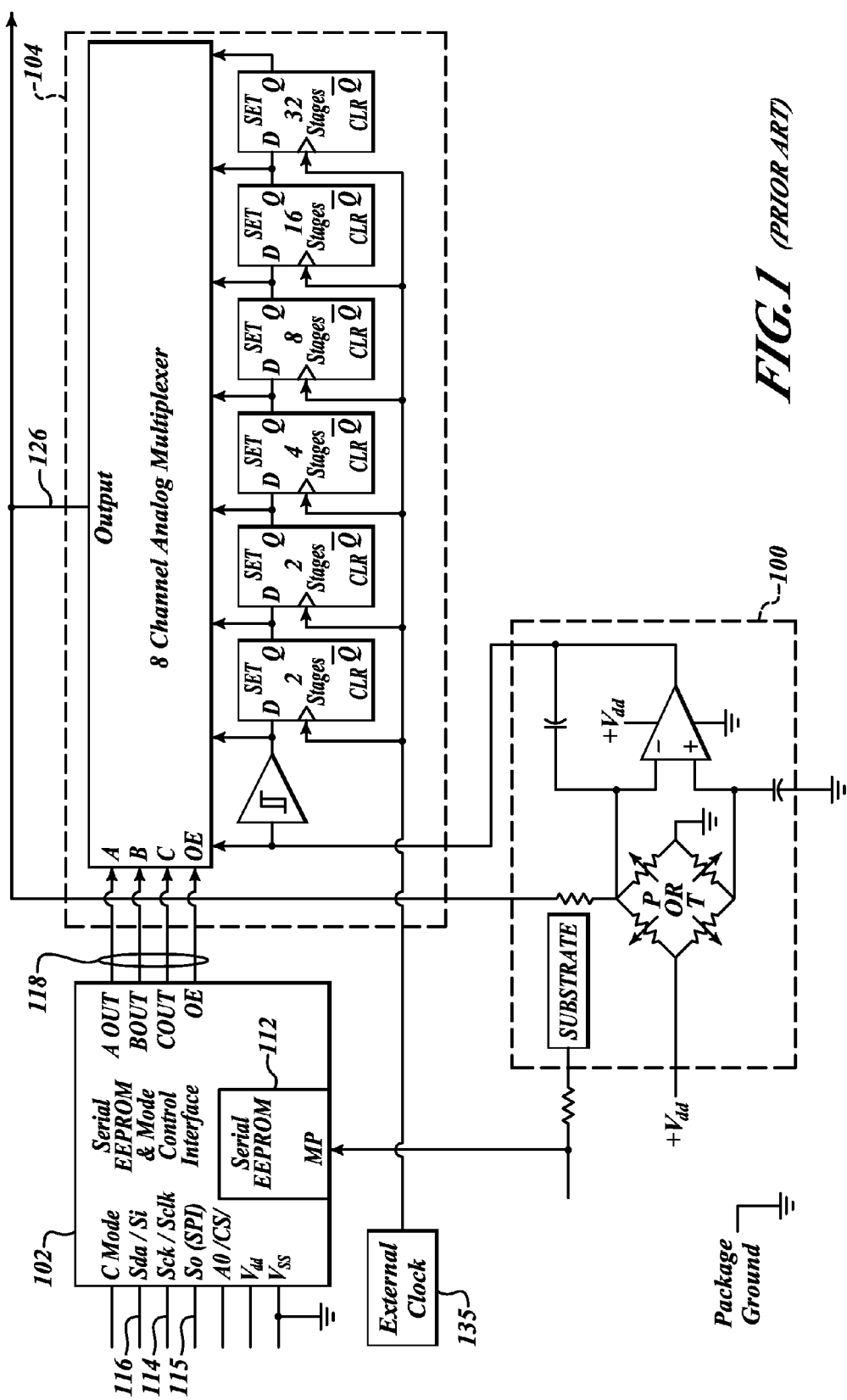
FIG. 1 is a schematic diagram of the electrical portion of an integrated sensor described in U.S. patent application Ser. No. 11/639,686 now U.S. Pat. No. 7,501,968 filed 15 Dec. 2006.

Hardware Implementation:

Turning now to FIG. 1, the electrical portion of an integrated sensor system from U.S. patent application Ser. No. 11/639,686 now U.S. Pat. No. 7,501,968 filed 15 Dec. 2006 is shown for reference. This is the baseline circuit to which the innovations of this patent are added.

In the prior cited application shown in FIG. 1, circuitry 100 and 104 are replicated twice within the Integrated Sensor System (ISS) as is also done for this application; one channel being used for measuring pressure, and the other for measuring temperature respectively. An interface circuit 102, signals 114, 115, and 116, and a clock 135 are singular and are shared between the channels. The temperature channel is used to sense local temperature for subsequent algorithmic correction of thermal effects on both the pressure and temperature channels. The combined circuitry shown in FIG. 1, when appropriately configured, generates a pulse density modulated output signal for each channel at an output node 126 based on the magnitude of the applied stimulus for the respective channel. The "density" of this logic level signal output varies between "0" and "1" where "0" would represent a constant logic low output, "1" would represent a constant logic "1" output, "0.5" would represent an equal density of "0's" and "1's", etc., with differing values between "0" and "1" being possible when the pulse density is averaged over a given time interval. This principle is a variation of a classic sigma delta analog to digital converter approach.

The interface circuit 102 stores calibration model coefficients in its memory 112. These calibration coefficients, as is generally known, are used to provide an algorithmic means of flexibly and reliably increasing sensor accuracy over the entire operational thermal and pressure range without incurring the penalty of added analog compensation hardware.

The manner by which the output circuit configuration shown in FIG. 1 implements the asynchronous and synchronous, self-digitizing, Σ-Δ processing modes is described in more detail in U.S. Pat. Nos. 6,674,387 and 5,245,343, and U.S. patent application Ser. No. 11/639,686 now U.S. Pat. No. 7,501,968 respectively, which are assigned to the Assignee of the present application, and the entirety of which are hereby incorporated by reference.

Figure 2:
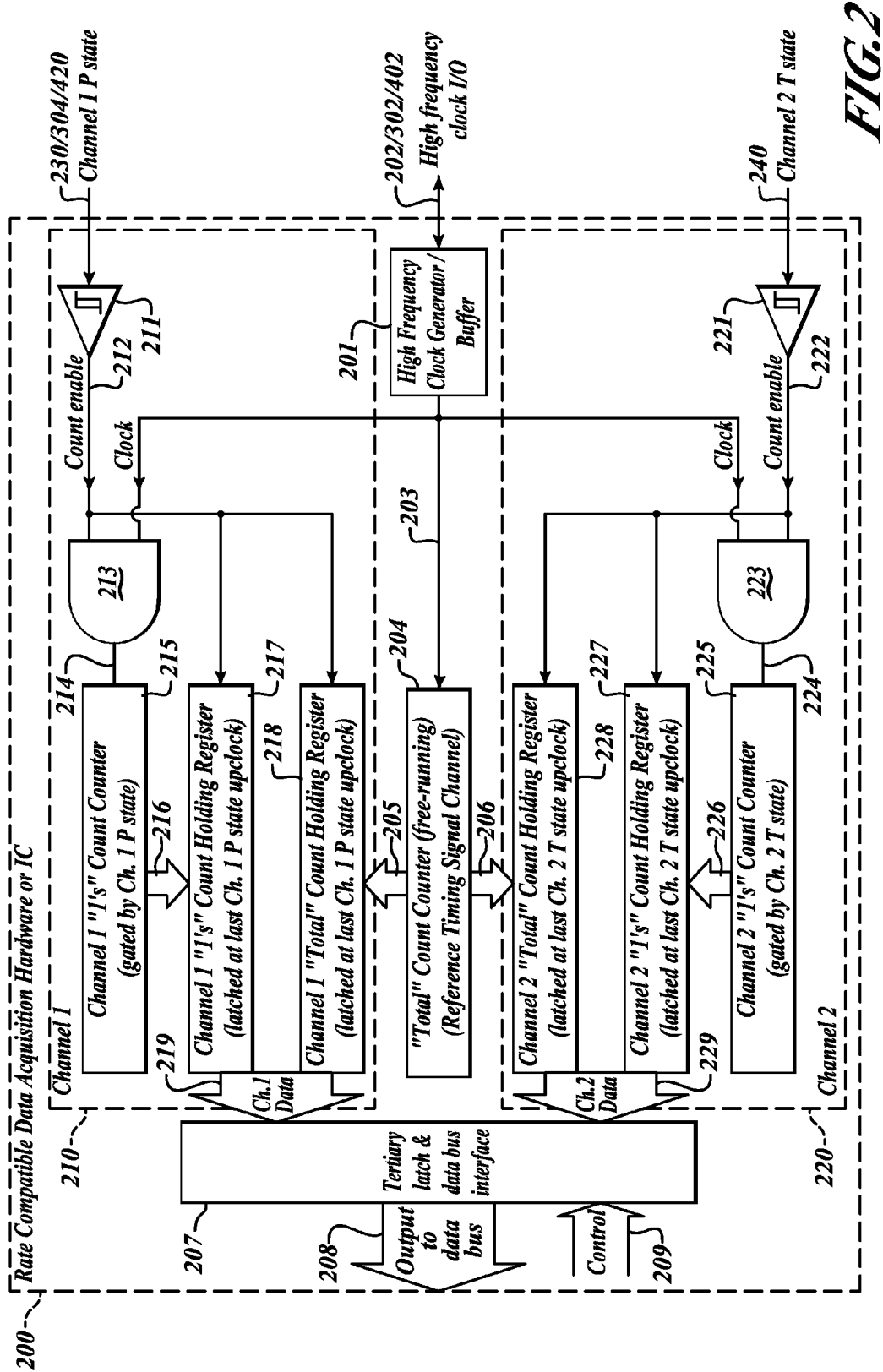
FIG. 2 is a schematic diagram of internal data acquisition circuitry that is added to the system shown in FIG. 1 to implement the exemplary ISS formed in accordance with an embodiment of the present invention.

FIG. 2 illustrates data acquisition circuitry 200 that is internally added to FIG. 1 (to the circuit 102) to implement the invention that is the subject of this application. The data acquisition circuitry 200 includes a clock generator/buffer 201; Schmitt triggers 211 and 221 for input signal conditioning; AND gates 213 and 223; a plurality of "1's" Count Counters 215 and 225, one per measurand channel; a singular "Total" Count Counter 204; holding registers for each counter 217, 218, 227, and 228 and a tertiary latch and data bus interface 207.

The clock generator/buffer 201 incorporated internal to the ISS may be overridden by an external clock source (not shown) that is connected to the clock I/O pin 202 if desired. When operating as an internal generator, the high frequency clock pin 202 serves as an output for external usage if desired.

The internal clock generator/buffer 201, while not thermally stabilized, is "modeled" for thermal effects such that an accurate determination of time may be algorithmically attained by knowing the sensor's temperature as previously sensed by Channel 2 (the temperature sensing channel) and the modeling coefficients contained within the sensor's memory (EEPROM 305, FIG. 3) that define the algorithmic corrections for the oscillator's raw frequency variation with temperature. The algorithm is a polynomial series having a predefined format; the coefficients for each of the terms in the polynomial series, however, is determined by testing and curve fitting to that data. For example Y=computed output frequency=$F \cdot (a_0 + a_1 \cdot T + a_2 \cdot T^2 + a_3 \cdot T^3 + a_4 \cdot T^4 + a_5 \cdot T^5 + \ldots)$. Where F is the nominal oscillator frequency at a fixed 25° C. reference condition; · is the multiplication operator; the subscripted "a" terms are the unique calibration coefficients that are indeterminate until data reduction after testing; and the superscripted powers of T are the normalized temperature measurements. So the form of the algorithm is fixed, but may not be the same form as shown in the simplistic example, but the individual "a" coefficients and F will be determined as a result of testing. The EEPROM 305 also contains the sensor's algorithmic pressure versus temperature calibration coefficients. It should be noted that the oscillator frequency is not altered by this algorithmic correction—the algorithm just defines the frequency and deviation from the desired frequency at any temperature within the "modeled" temperature range. In that manner, the using system may fine-tune its timing loops real-time to adjust for thermal environment induced variation in the oscillator frequency.

The Schmitt triggers 211 and 221 buffer the pulse density modulated signals output by the front-end Σ-Δ A/D converter from each respective input channel.

The AND gates 213 and 223 control flow of the high frequency clock into the data acquisition "1's" Count Counters 215 and 225 in response to the respective Schmitt trigger signals. The AND gate 213 is enabled when the "P State" signal 420 causes a "Count enable" signal 212 from the Schmitt trigger 211 to be logic high; it will output a pulse train 410 (FIG. 4) at node 214 as long as the respective "Count enable" signal 212 remains high.

A single free-running "Total" Count Counter 204 increments on every clock cycle's upclock as output by the clock generator/buffer 201 in this example. This could alternately be implemented differently to increment on the downclock. Both the "1's" Count Counters 215 and 225 and "Total" Count Counter 204 should be configured to clock on the same edge. All holding registers should be similarly configured to synchronously clock on the same high frequency clock edge, be it either the up or downclock in response to the respective count enable signals 212 and 222, The "Total" Count Counter 204 is used to provide a reference time stamp for every packet of data acquired by the respective channel's "1's" Count Counter 215 and 225.

The "1's" Count Counter 215 and 225 implements a numerical integration by accumulating the output pulse train from the respective "1's" channel AND gates 213 and 223. The "1's" Count Counter 215 and 225 for each channel is incremented by the clock generator/buffer 201 as gated by the "AND" gates 213 and 223. Since the implementation of the P (pressure) and T (temperature) channels is identical, only the "P Channel" will be described in the subsequent explanations.

It should be noted for completeness in this application, that the counters 204, 215 and 225 are never reset, they just continue to count and roll over at the terminal count. Therefore, when the counter data is ultimately read and processed, accommodation must be made in the data reduction to account for a singular roll-over event at most every other measurement interval.

The change in count accumulated by the "1's" Count Counter 215 over a system interrogation interval axis 440 "S" (FIG. 4) will be equal to the count accumulated in the "Total" Count Counter 204 multiplied by the average duty cycle of the "P State" signal 420 over that identical interval. Thus, the count accumulated in any given interval will be smaller for the "1's" Count Counter 215 than for the "Total" Count Counter 204.

The numeric ratio of the counts accumulated in the "1's" Count Counter 215 divided by the number of counts accumulated in the "Total" Count Counter 204 over an identical interval will be subsequently reduced to a "Duty Cycle" measurement of the "P State" signal 420 that will be the basis of subsequent computations. This division occurs externally in the subsequent data processing steps done by a microcomputer as depicted in FIG. 6 #605 and 610. The division is required to convert the raw count data from the frequency domain into a dimensionless duty cycle. Because both the numerator and denominator's frequency can vary due to the tolerance of the high frequency clock signal 303, converting to a duty cycle by dividing by a term that has an identical frequency variability eliminates that variability as an error source in the solution of the equation that ultimately converts duty cycle to pressure. That duty cycle is typically set to cover a range between two percent and 98 percent but cannot exceed the range defined by the zero percent and 100 percent limits.

Holding registers 217, 218, 227 and 228 are implemented to capture the current count in the respective counters at the instant the output signal from the respective channel's Schmitt trigger 211/221 makes its low to high transition. Note in FIG. 4 that the "P State" signal's 420 edges change synchronously with the upclock (this could optionally be configured to occur on the downclock instead) of the clock signal 403—every transition from a low to high is an "upclock". The respective counter's data is captured by the respective holding registers 217 and 218, at the upclocks of the "P State" signal 420. This occurs at a data-driven rate determined by the frequency of the upclocks of the "P State" signal 420.

The current count within the Channel 1 "1's" Count Counter 215 is loaded into holding register 217; the "Total" Counter output 205 is also loaded into a separate holding register 218 for Channel 1's "Total Count" at the time of the respective "P State" signal 420 upclock. These registers are double buffered to insure that a complete data transfer occurs if a new measurement upclock, "A#"'s shown on axis 470, were to occur during the transfer of data from the holding register to the output data bus via the interface 207 and data bus 208.

The tertiary latch and data bus interface 207 prevents serial interface output data 208 from being overwritten before a matched set of output data, consisting of "1's" and "Total" counts for the respective channel, has been made available to the user system.

Figure 3:
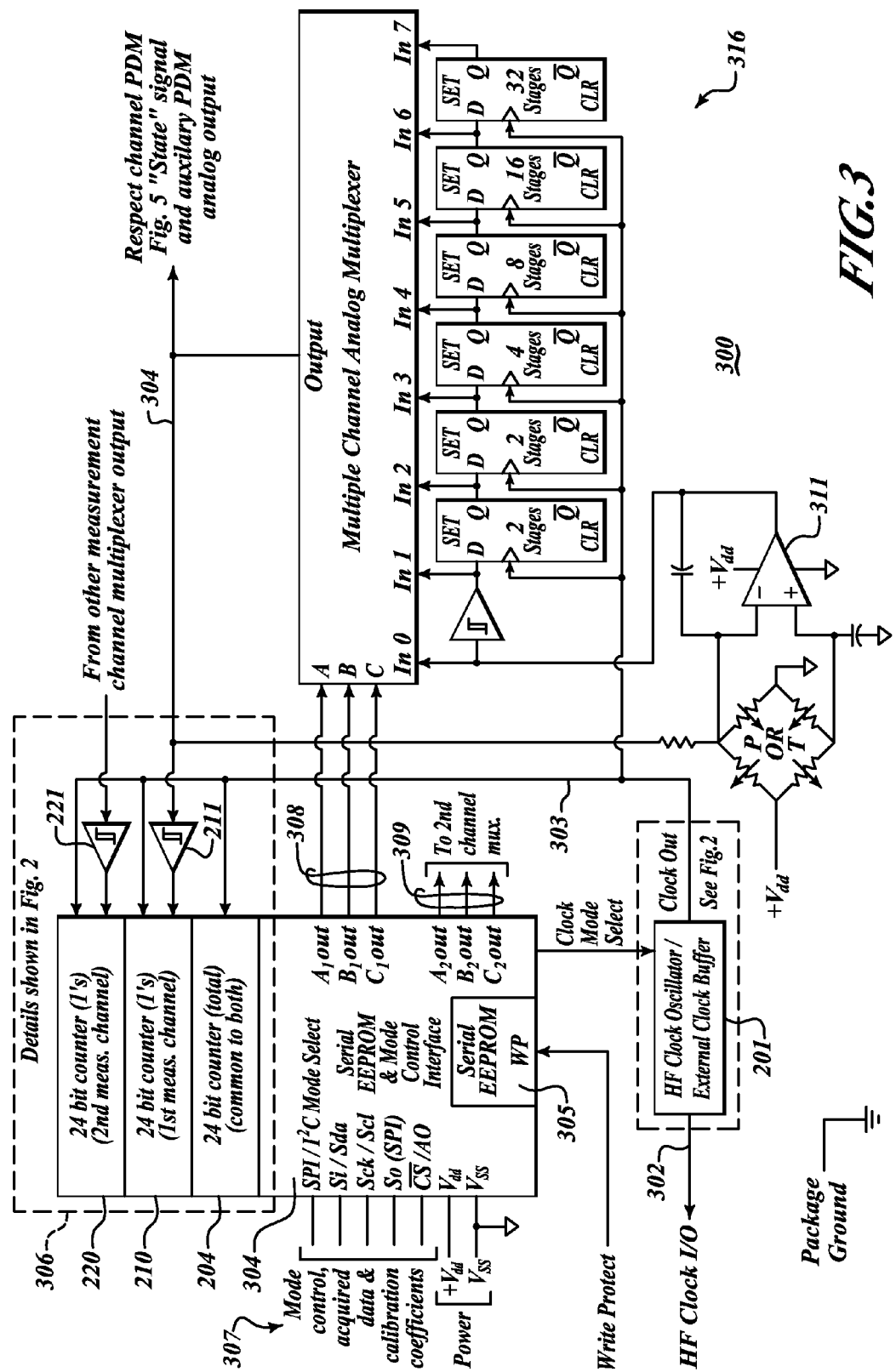
FIG. 3 is a schematic diagram of the complete sensor that incorporates components from FIGS. 1 and 2 illustrating the expanded data acquisition features necessary to implement this invention.

FIG. 3 illustrates the integration of the hardware of FIG. 2 with the system of FIG. 1. In this implementation, dynamic measurement magnitude and timing data and static clock oscillator performance model data are additionally transferred over the serial interface 307 that represents an expansion of the interface information as shown in FIG. 1. In that prior application, only static (unchanging) data was transferred over the serial interface signals 114, 115, 116 (FIG. 1) using industry-standard SPI or I²C protocols as selected by the mode control discrete. That prior static data was limited to: 1) calibration coefficients that were transferred into or out of the embedded memory 112 (FIG. 1); 2) multiplexer channel select discretes 118 (FIG. 1) that configure the operating mode (multiplexer channel) of the sigma delta A/D converter; and 3) manufacturing and calibration records such as serial number, calibrated pressure range, date of calibration, etc.

In the embodiment presented in this present application, the counter-timer resources 306 (FIG. 3) that is presented in detail as circuitry 200 (FIG. 2) are incorporated within the interface circuit 300 located inside the sensor. This eliminates the need for additional application-specific clock and counter-timer resources within the system's microcomputer to acquire and translate the intermediate PDM-based digital output signal into numeric values as required by the prior cited application. In this embodiment, the interface circuit 300 is preferably implemented using an I²C or SPI compatible interface 307, which is depicted, for completeness, in FIG. 3; although other interface protocols could be used without diminishing the applicability of this invention. I²C or SPI interfaces are preferred to minimize sensor package pin count.

Circuit Operation:

To begin, for example, the circuitry of FIG. 3 will generate an intermediate pulse density modulated (PDM) signal at node 304 that is essentially proportional to the applied measurand, be it pressure or temperature. Illustrated in FIG. 4 the "P State" signal 420 is an example signal that represents a 33.3 . . . percent duty cycle. This data will be acquired synchronously by the data acquisition component resources (counter-timer resources 306) portion of FIG. 3 that is detailed in FIG. 2, which is the focus of this invention.

The "P State" signal 420 represents the output duty cycle from the pressure channel's Σ-Δ A/D conversion at node 304. The temperature channel will similarly output a "T State" signal (not shown) and it will not be discussed further since its implementation and operation is identical; only the source of input data differs.

The signal 403 is a high frequency clock that is present at node 303 and used by the sensor to perform its digitization of analog data. The clock signal 403 (at node 303) may be supplied by an external source at node 302 or be generated by the clock oscillator/buffer 301. The clock signal 403 (at node 303) may have a frequency range from hundreds of kilohertz to over a hundred megahertz depending on the number of stages in the shift register 316 and the characteristic bandwidth of an amplifier 311

The "P Count" signal 410 represents the product of gating the high frequency clock signal 403 with the ISS' "P State" Pulse Density Modulated (PDM) duty cycle signal 420. The signal 410 is subsequently counted within the "1's" Count Counter 215 to determine the average density (duty cycle) of the "P State" signal 420 over any interval desired by the subsequent processing within the system's computing resource. The ratio of the measured "1's" Count 216 (numerator) to the "Total Count" 205 (denominator) acquired over the duration of a measurement interval establishes the average duty cycle. When the circuit is operated in the synchronous PDM mode (this refers to an internal synchronous digitization mode of the sensor in a prior-cited application—it is unrelated to the synchronous interface mode of FIG. 5B), the edges of the "P State" signal 420 are synchronized to the HF clock upclock (or downclock if so implemented). This mode enables the least noisy measurements to be made since the timing is most tightly constrained by the high frequency clock source, thereby eliminating the timing jitter that would occur if measurements were taken with regard to the external user system's 510 interrupt-based interrogation timing for accessing the data.

Figure 4:
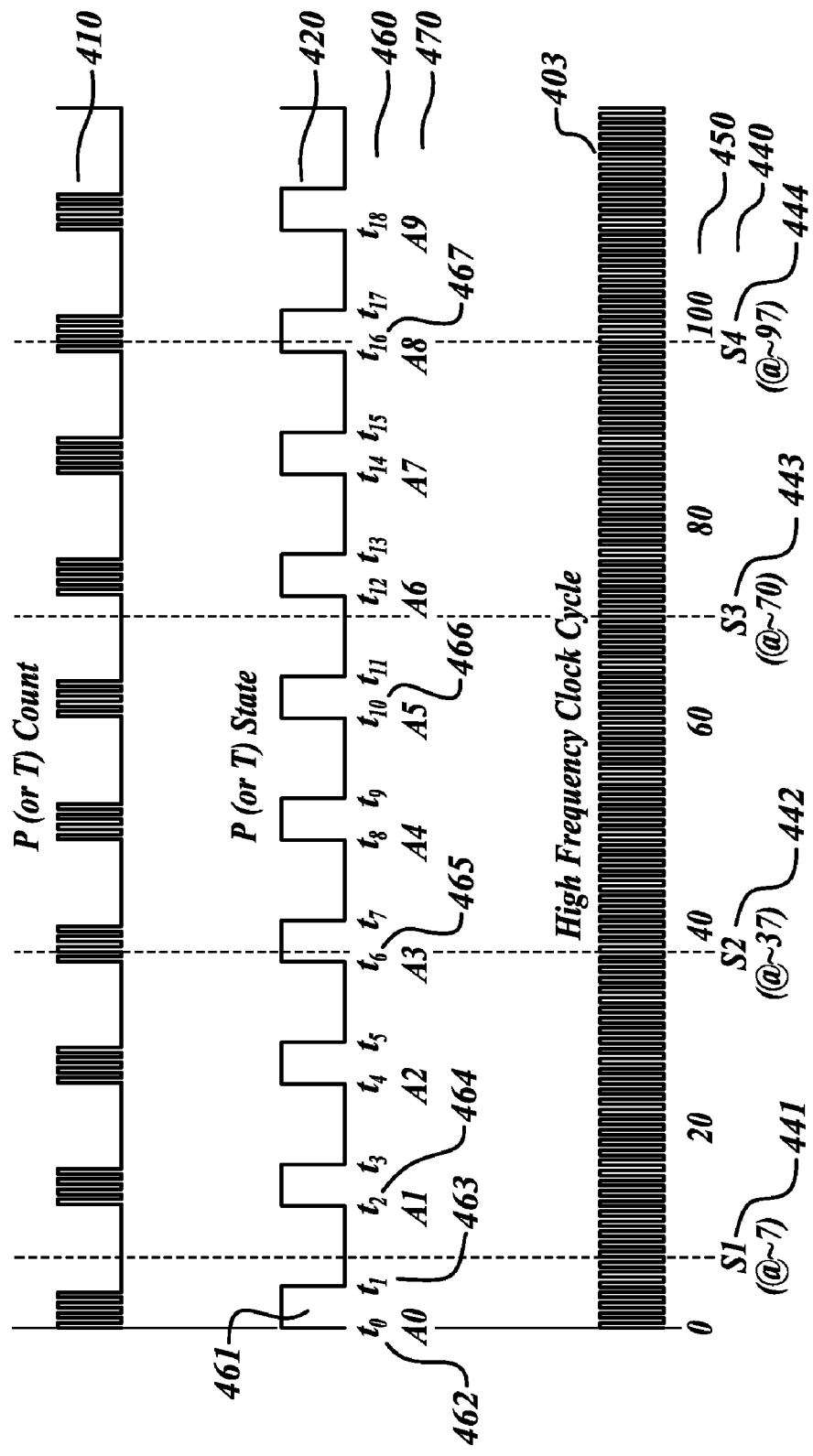
FIG. 4 is a timing diagram relating to the data acquisition process both within and external to the sensor.

As shown in FIG. 4, the "A" markings on axis 460 indicate the points where intermediate data is automatically transferred on-the-fly to holding registers 217 and 218 and is double-buffered by interface 207 for later reading by the system. The "S" markings on axis 440 are exemplary of system interrogation timing used to gather data from the double-buffered interface. Note that this system interrogation timing is deliberately non-uniform in this example to illustrate how insensitive this measurement technique is to jitter when operating in interrupt-driven systems. The first pair of system interrogations S1 441 and S2 442 are separated by approximately 30 cycles of the high frequency clock signal 403; the next pair at S2 442 and S3 443 are separated by ~33; and the last pair S3 443 and S4 444 are separated by ~27 cycles of the high frequency clock signal 403.

In order to minimize rate measurement noise, this system implementation also does not require the clock for the sensor at node 303 to be synchronized or at the same frequency as that of the processor in the using system 510 that externally reduces the raw numerical data into engineering units. The read rate timing by the user system in this implementation does not contribute to pressure rate (and derivative parameters such as altitude rate etc.) measurement jitter because the timing data provided by this implementation is internal to the sensor-referenced time frame rather than the external system time frame.

Using FIG. 2 "Channel 1" ("P Channel") and FIG. 4 as an example to further illustrate this:

At t0 462 there will be different arbitrary counts present in both the "Channel 1" "Total" Count Counter 204 and "1's" Count Counter 215.

At t1 463 both the "Channel 1" "Total" Count Counter 204 and "1's" Count Counter 215 will have incremented 4 counts during the first pulse 461 of the "P State" signal 420. After the "P State" signal 461 returns to a logic zero, the "Total" Count Counter 204 will continue to count the high frequency clock pulses of signal 403 while the "1's" Count Counter 215 will stop counting while the "P State" signal 420 is in the logic low state.

At t2 464 the "Total" Count Counter 204 will have incremented 12 counts from its beginning value while the "Channel 1" "1's" Count Counter 215 will have incremented only four counts. The upclock of the "Channel 1" "P State" signal at t2 464 will transfer the "1's" Count 216 and "Total Count" 205 values from the respective Count Counters 215 and 204 into their respective holding registers 217 and 218. This cycle repeats itself with every upclock—A# markers (shorthand for "acquire" data) on axis 470—of the "Channel 1" "P State"

signal 420. In this example, the duty cycle is exactly 33.3 . . . percent even given our single "P State" cycle 461.

If the system initially reads the data from this pressure sensor at system interrogation point S1441 on axis 440, the sensor will return the "1's Count" and "Total Count" values 216 and 205 existing at t0 462 on axis 460. In the case of a read at S2 442, the "Total Count" would be the value existing at the time of the upclock of the "P State" occurring at t6 465 in this case, that count would be 36 counts larger than at t0 462. The prior measurement value is subtracted from the latter in each case to derive the count accumulated in each counter over the respective measurement interval t6 465–t0 462 per the procedure outlined in FIGS. 6A-C.

Note that the true measurement interval is not precisely that of the system interrogation but rather is data driven by the prior upclocks of the "P State" signal 420 at the "A" numbered markers on axis 470 that identify the upclocks. The measured average duty cycle that represents the raw measurement data for the "P Channel" is determined by dividing the "P Channel's" "1's Count" change from t0 462 to t6 465 by the "P Channel's" "Total Count" change over the same interval. That data will subsequently be used by an algorithm, perhaps in conjunction with data from the second measurement channel 220 that may measure temperature for example to arrive at a more precise algorithmically temperature compensated "calibrated" measurement value.

For attaining higher resolution measurements, the time interval over which "P State" data is acquired should be increased to a practical value to trade off software timeloading versus resolution. Therefore, the user system 510 will set some typical interval at which it will read data from the device; that would typically be much longer than can be described using the compressed example presented in FIG. 4.

The duty cycle measured by the above approach, when given a sufficient measurement interval, has extreme precision since the precise time at which the "1's" Count 216 (numerator) and "Total Count" 205 (denominator) data was acquired is communicated directly to the user system.

This approach whereby a data-driven variable denominator is used in the calculation effectively increases the resolution by a factor $K=1/(duty\ cycle)$. Therefore when operating around a 10 percent duty cycle measurement, the effective resolution will be ten times that of a classic first order sigma delta A/D converter at the same nominal duty cycle. This feature enables extremely high precision measurements to be made in a single conversion cycle while using only a modest clock frequency. This is illustrated simply by comparing the minimum duty cycle step value in a conventional sigma delta converter where the numerator only increments versus this implementation where both the numerator and denominator may increment: conventional numerator only based step of 100/1000=0.1000, next step 101/1000=0.1010, therefore resolution is 0.001; time variant denominator approach 100/1000=0.1000, next increasing step 100/999=0.1001, which is 10× finer resolution at a 10 percent duty cycle. When operating at duty cycles above 50 percent, a $K=1/(1\text{-duty cycle})$ improvement may be attained by using (1-duty cycle) in lieu of straight duty cycle in the mathematical reduction process. Because the counters actually implemented in the counter timer resources 306 are 24 bit, contrary to the simplistic example, the actual hardware may be configured to yield sub-one part-per-million resolution.

Again, using FIG. 4 for the example, this time determining the rate of change of the measurement parameter. Using the "1's Count" and "Total Count" data accumulated for the "P Channel" ("Channel 1") 210 between times t0 462 and t6 465 as a first measurement will provide raw duty cycle measurement for the first value upon which to base a parameter's rate of change computation. For a second input to the rate of change computation, the "1's Count" and "Total Count" values accumulated between t6 465 and t10 466 that represent the data within the holding registers 217 and 218 at system interrogation time S3 443. Each computation will provide an accurate measurement of the measurand's averaged duty cycle over at the respective numerical integration interval defined by t0 462 to t6 465 for the first measurement and t6 465 to t10 466 for the second measurement.

By subtracting the second duty cycle computation from the first duty cycle, the difference between the second and first duty cycle is determined, thus representing the change in the measurand's raw value. That difference is then divided by the "Total Counter's" time difference automatically acquired along with the "1's Count" at t6 465 and t10 466. This yields an output that represents $\Delta$ measurand/$\Delta$ time which is equivalent to the measurand's rate of change.

It is important to determine the duty cycle prior to making this computation rather than just using the difference in "P Count" divided by the difference in "Total Count." The variation in the denominator count contains high resolution phase information that will effectively be lost if this procedure is not utilized; that was enumerated in the previous example illustrating the benefit of the data-driven variable numerator and denominator approach.

It is this tight synchronous linking of the measurement interval to the acquired sigma delta data acquisition scheme that enables very low noise, low jitter measurand rate signals to be derived from the raw data. In most microprocessor-based data acquisition schemes, the A/D conversions are pseudo-synchronous, typically relying on timer-based interrupts and other timing schemes that can contribute to measurement jitter.

The present invention yields not only an accurate A/D conversion but also a precisely-coupled time stamp for each data packet acquired. Although this approach forces an inherent time dither in the denominator term, its synchronous acquisition with the numerator data eliminates its effect on perceived measurement jitter at the end system level once the computational process of FIGS. 6A-C has been followed. This approach reduces the jitter in the denominator term relative to the numerator term when making rate measurements. That is because in this case an assumed data acquisition time is not used, but rather the actual data-driven time along with a stored time stamp for each packet of data. That time is partitioned into multiple smaller packets and the data from the summation of all the packets prior to the last upclock shown as axis 470. "A numbers" of the "P State" signal 420 that are used to derive the final data used in the rate computation.

The resulting rate measurement accuracy is limited mainly by the accuracy of the reference clock source driving it and the resolution of the data acquisition and computation. If a high precision, stabilized clock is available, it may be alternately input to the sensor to override the sensor's internal clock 201 and 301. That method would not then need or utilize the clock calibration coefficients embedded within the sensor's EEPROM 305.

This system approach also allows a rate of change measurement to be easily made at faster repetition rates for the system interrogation points "S" markers shown on axis 440. This faster data acquisition allows any subsequent software-based low-pass filtering to be applied in a faster loop, and with a higher cutoff frequency, thus maximizing the frequency response of the rate measurement computation while further reducing its noise.

Figure 6A:
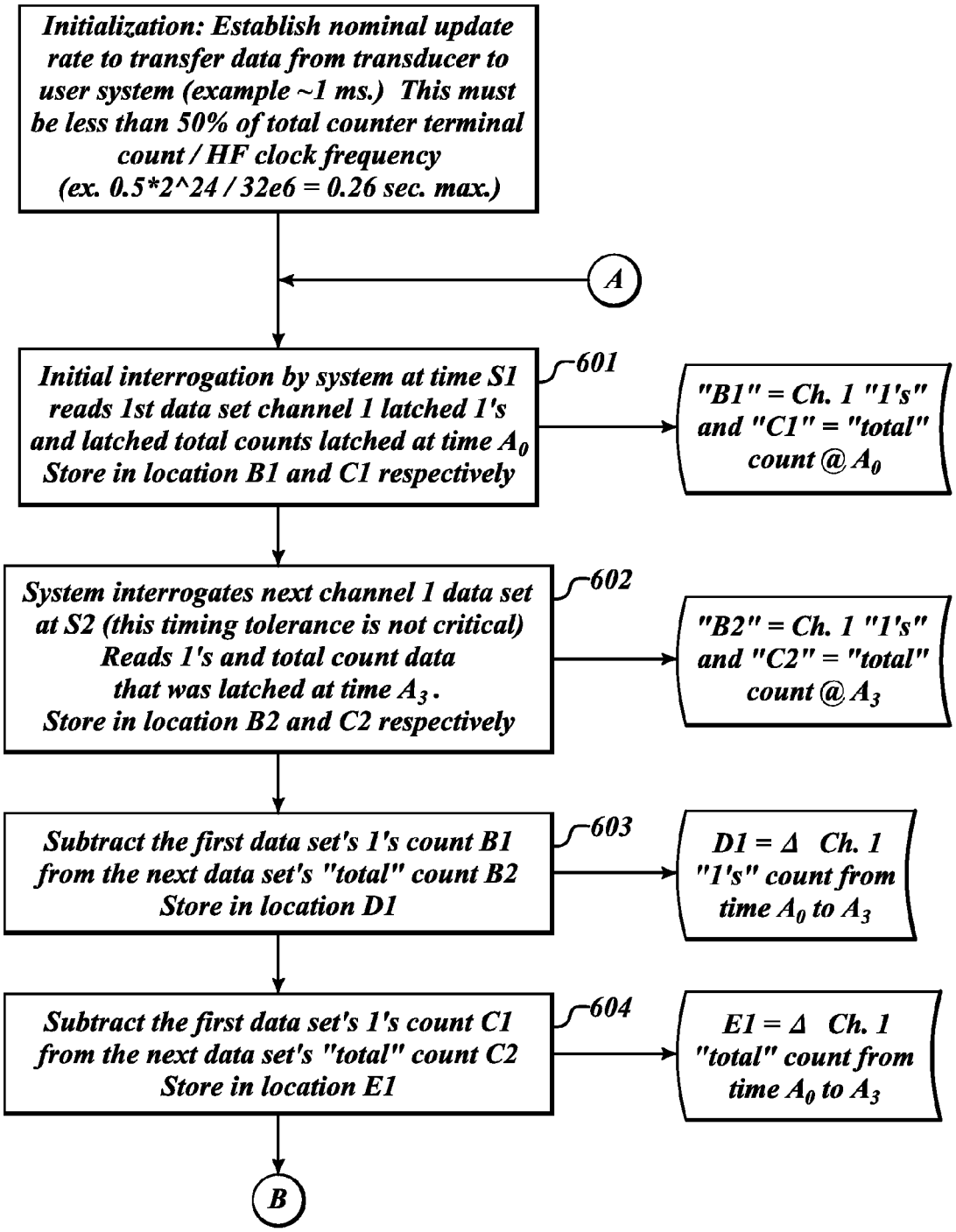
FIGS. 6A-C illustrate a flow chart relating to the external data processing steps used with this invention to yield very high resolution, low noise measurements.
Figure 6B:
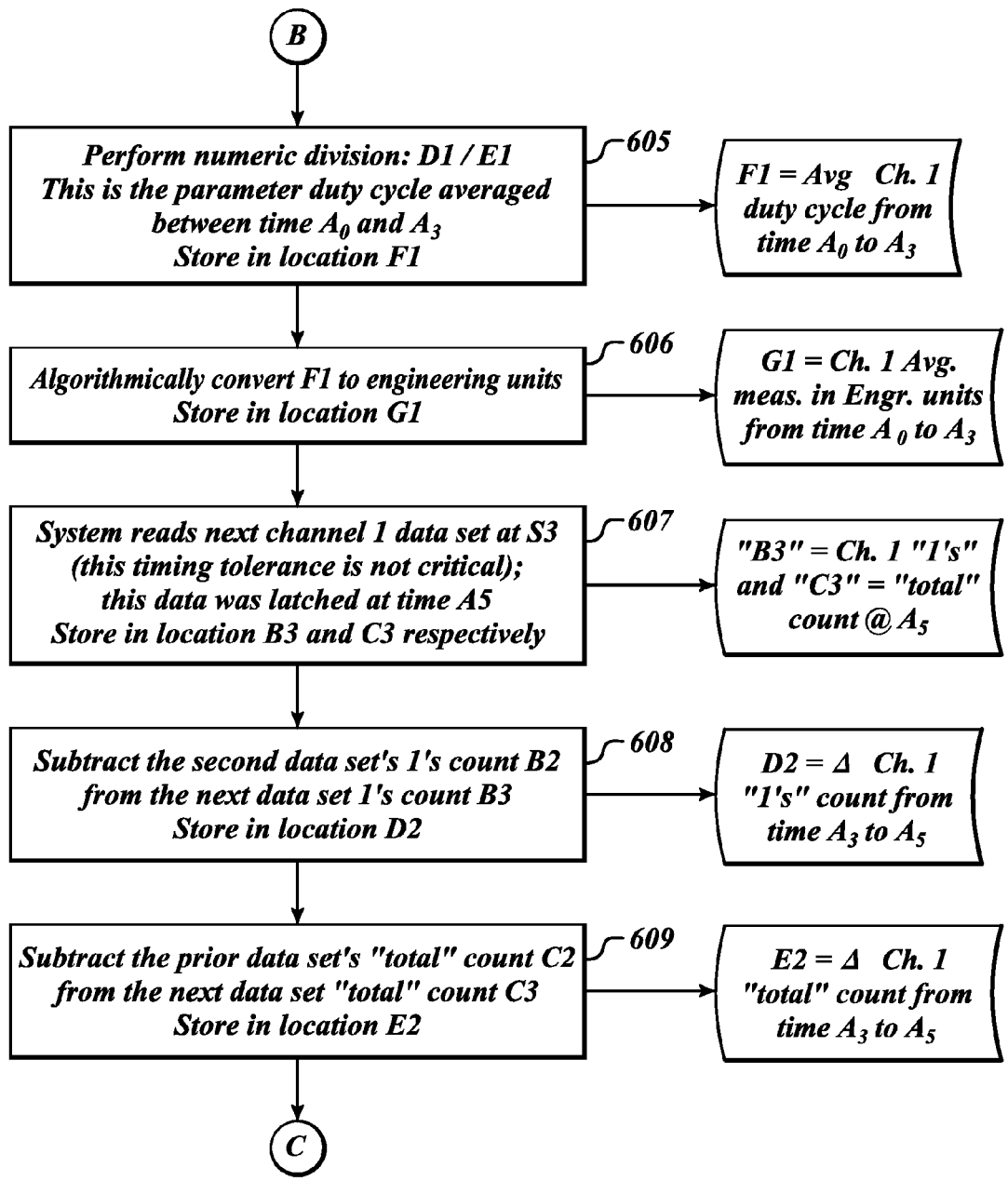
Figure 6C:
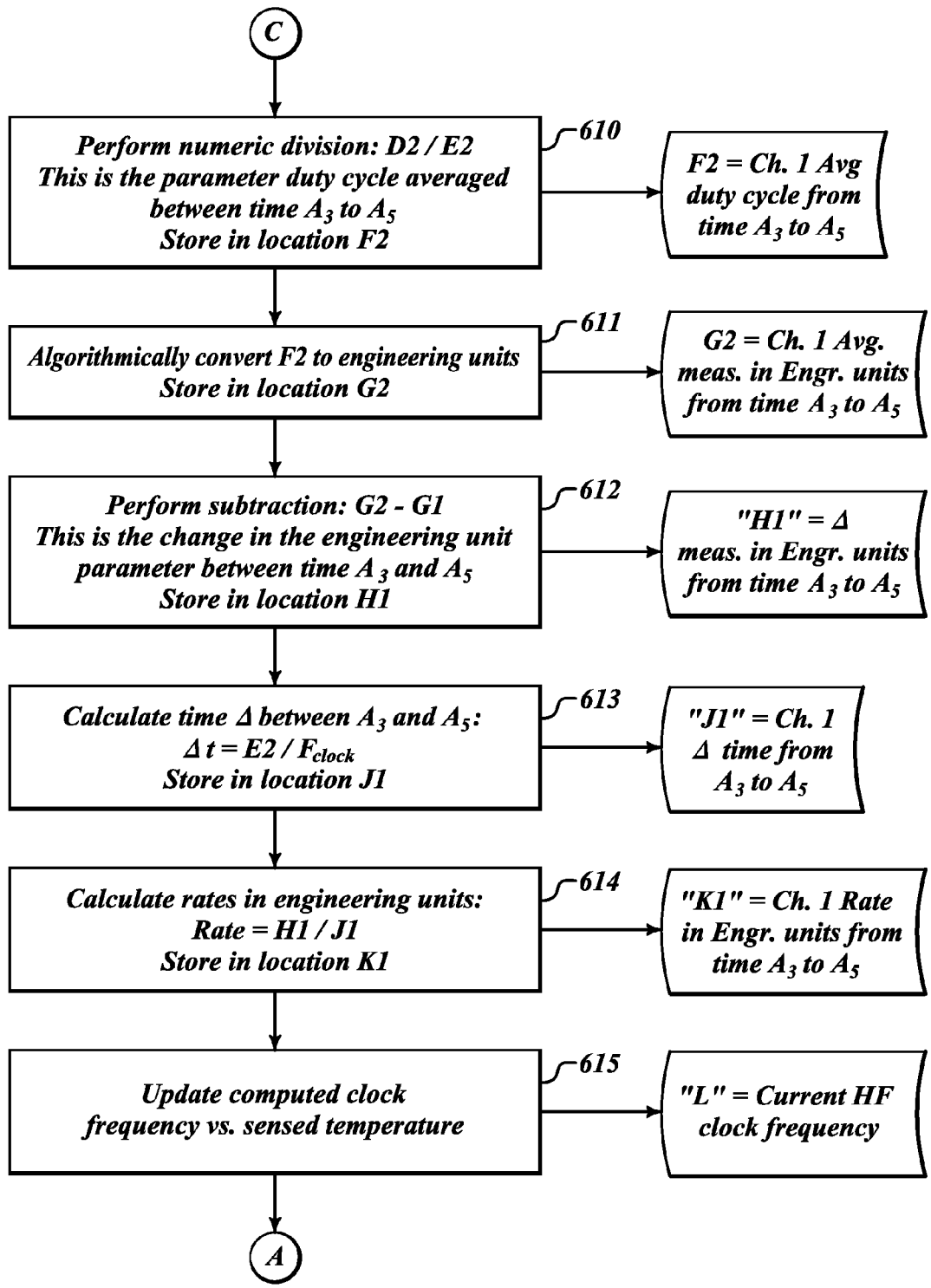

An example of the process by which precision rate-compatible data such as that acquired by the hardware shown in FIGS. 2 and 3, having the characteristics illustrated in FIG. 4, and being processed using the method of FIGS. 6A-C is described in the following paragraphs.

The system's interrogation of data from the sensor is illustrated by the system data acquisition timing marks labeled "S no." on axis 440. These interrogation points are not required to be tightly controlled with this sensor embodiment in order to attain tight rate measurement accuracy in contrast to other competing implementations. The following detailed example will illustrate how this is attained. This process is also illustrated in flow chart of FIGS. 6A-C.

In the example shown in FIG. 4, the upclocks, occurring at points marked "A" on axis 470, of the "P State" signal 420 occur every twelve clock cycles shown on clock timing axis 450; therefore t0 462 at clock cycle no. 0, t2 464 at clock cycle no. 12, t6 465 at clock cycle no. 24 etc., As can be seen by the upper "P Count" 410 each logical "1" "P State" signal 420 gates four clock cycles through to the "1's" Count Counter 215. At time t0 462, the current counts existing in the "P Channel" "1's" Count Counter 215 and "Total" Count Counter 204 are copied into the respective holding register 217 and 218. For ease of illustration in this example, zero is used as an initial value for both. At system interrogation, time S1 441, whose timing is not critical, occurs at approximately the time of HF clock 403 pulse no. 7 on axis 450.

The "1's" Count 216 and "Total Count" 205 data that was copied prior to this time into registers 217 and 218 is read through interface 207 by the system and transferred into the system memory space per the process illustrated in FIGS. 6A-C. For this example, the memory location into which the data transferred at time S1 441 is labeled "B1" for the "P Channel" "1's" Count 216, and "C1" for the "P Channel" "Total Count" 205 at time t0 462. This is shown in block 601.

The next system interrogation of the transducer is illustrated at time S2 442, which occurs at the approximate time of HF clock 403 pulse no. 37 on the time axis 450. That interrogation will read the "1's Count" and "Total Count" data 216 and 205 stored at time t6 465 and store it in memory locations B2 and C2 respectively. This is shown in block 602. The next step (blocks 603-605) is to reduce the data from t0 462 to t6 465 into an equivalent numeric duty cycle by performing a mathematical operations described in FIGS. 6A-C. The average duty cycle over interval t0 442 to t6 465=$([B2]_{602}-[B1]_{601})/([C2]_{602}-[C1]_{601})=([D1]_{603})/([E1]_{604})=([F1]_{605})$ where the brackets indicate the contents of the memory locations and the subscripts indicate their reference blocks in FIGS. 6A-C. In this case, this would equate to: average duty cycle t0 462 to t6 465=(12−0)/(36−0)=33.3 . . . percent. When reading the counters, it should be noted that the data processing must account for a single counter roll-over in a properly configured system since the counts are always increasing in real time. This data would then be algorithmically converted into an equivalent pressure reading expressed in engineering units, block 606. At the next system interrogation of the transducer at time S3 443, the "P Channel" "1's" Count 216 and "Total Count" 205 readings that were automatically acquired at time t10 466 will be read and transferred into memory location B3 and C3 respectively as shown in block 607. This is similarly reduced as before except for the new measurement interval being between t6 465 and t10 466 (blocks 608-610). Note that the data transferred is the last double-buffered data stored at t10 466 that occurred prior to the system interrogation at time S3 443. In this case, from t6 465 to t10 466, the average duty cycle=$([B3]_{607}-[B2]_{602})/([C3]_{607}-[C2]_{602})=([D2]_{608})/([E2]_{609})=[F2]_{610}=((20-12)/(60-36)=33.3$ . . . percent.

For the subsequent system interrogation at S4 444, the average duty cycle from t10 466 to t16 467=(32−20)/(96−60)= 33.3 . . . percent. After each system interrogation, the duty cycle data should first be reduced to a measurement in engineering units per the process defined in FIGS. 6A-C. That is done to correct for non-linearities in the transfer function prior to the rate computation. If the transfer function between the sensed measurand and the final desired value in engineering units is linear, that pre-linearization step is not necessary.

The resulting measurement in engineering units is labeled "G no." in FIGS. 6A-C blocks 606 and 611. After S2 442, a parameter G1 (block 606) will be computed based on the data acquired between A0 and A3 and so on for each system interrogation with G2 (block 611) representing the average measurement parameter over the interval A3 465 to A5 466, and G3 representing the interval A5 466 to A8 467, etc. Converting into an engineering parameter rate of change 614 is subsequently done by dividing the difference in measured engineering parameter H1 612 between any two sets of "G" computations by the difference in the total time between the two respective "G" computations 606 and 611. That difference in time 613 being equal to the difference in the total count on axis 450 divided by the high frequency clock's frequency 403. That frequency 403 is very precisely defined algorithmically versus temperature with the EEPROM's clock modeling coefficients by the computation performed in block 615.

The curved boxes in FIGS. 6A-C represent temporary memory storage locations in the circular buffer referred to in the text. These memory locations are written to by the various processes (rectangular boxes) for each step. Once a full set of processes has been accomplished, the program loops back to the beginning and will over-write the prior data. So data in each location will be refreshed with the results of a new computation typically numerous times per second.

This previous example illustrated how timing variation in the system interrogation signal is de-coupled from affecting the measured duty cycle data, thereby yielding a robust, low noise measurement approach.

Figure 5A:
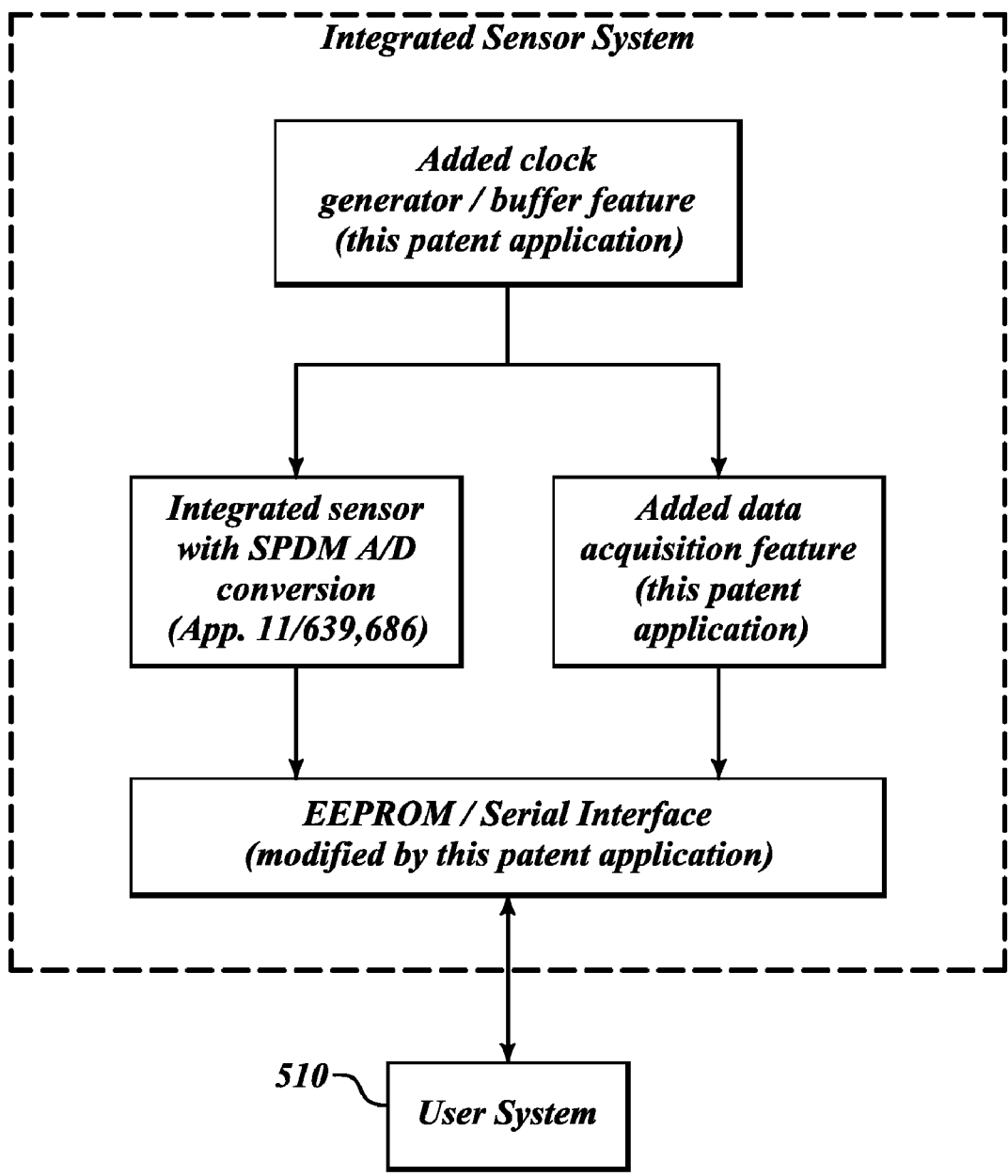
FIGS. 5A-C are block diagrams of complete measurement systems incorporating a rate-of-change compatible data acquisition device formed in accordance with an embodiment of the present invention illustrating the possible clocking interface options thereto.
Figure 5B:
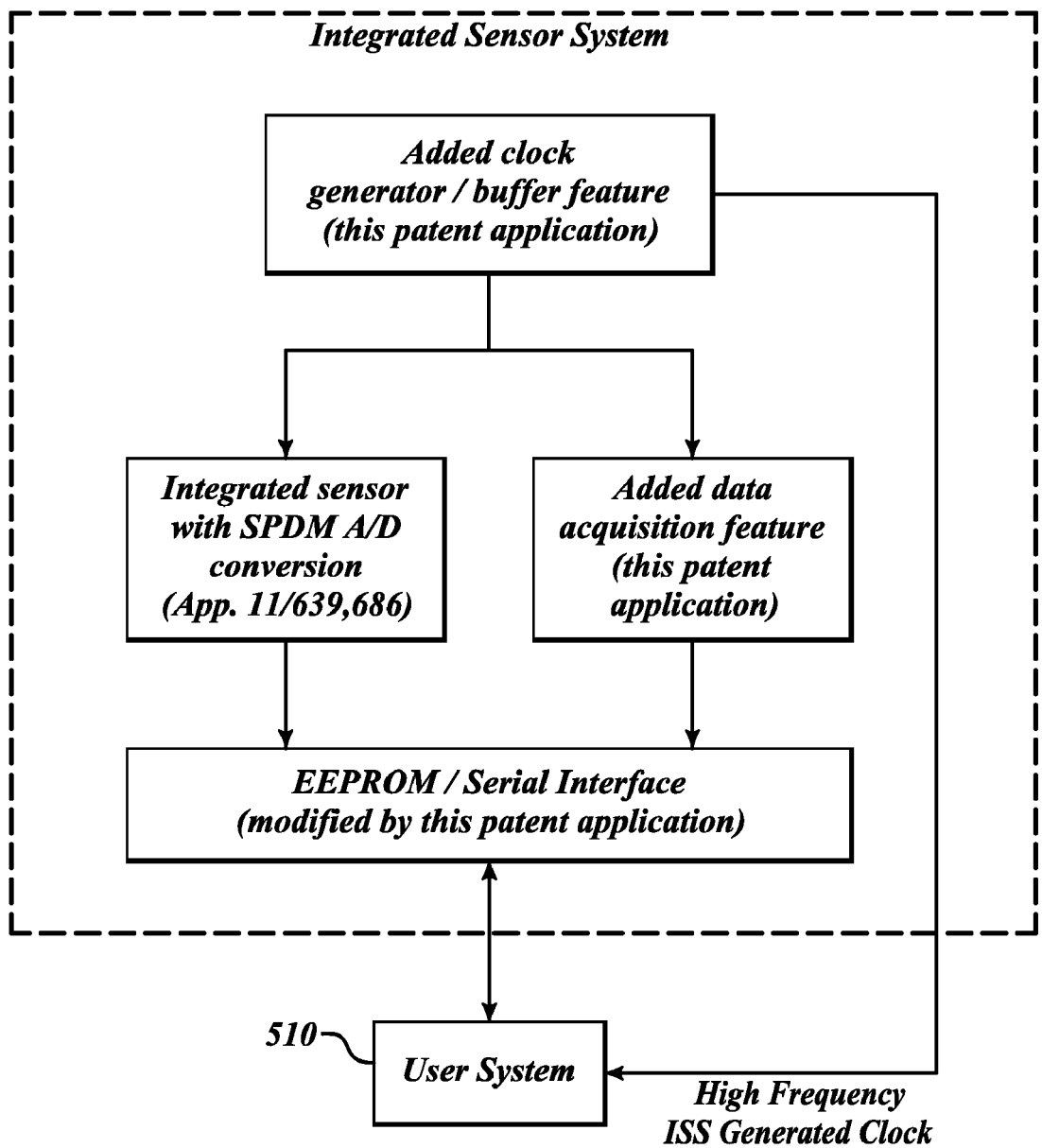
Figure 5C:
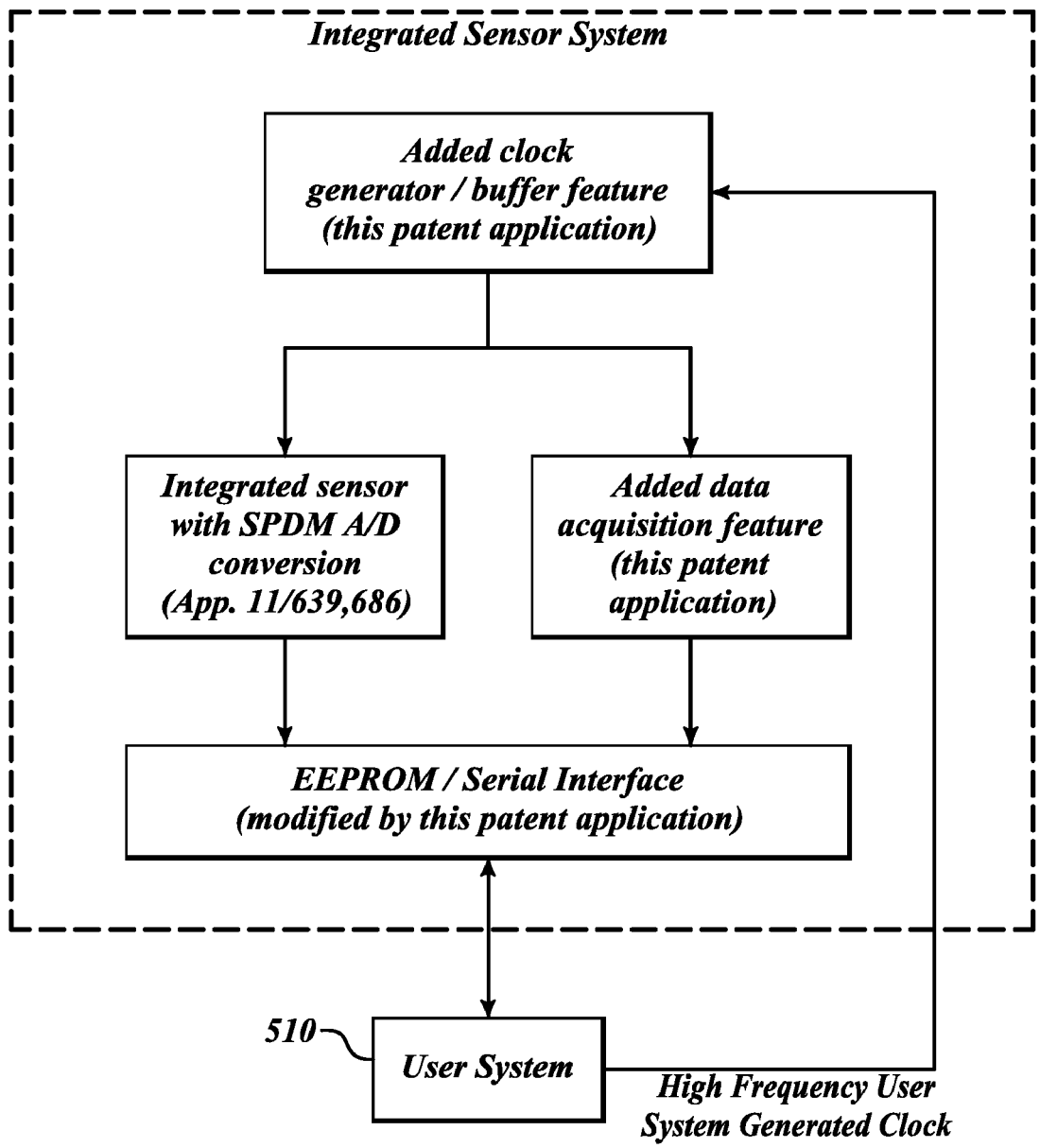

FIGS. 5A-C illustrate various interface embodiments of the present invention. A user system 510 may operate the sensor interface asynchronously as illustrated in FIG. 5A without significantly affecting rate measurement accuracy if the data processing flow depicted in FIGS. 6A-C is utilized along with the sensor's thermally modeled oscillator frequency as previously described.

FIG. 5B illustrates a synchronously clocked interface configuration where the sensor provides the system with an algorithmically calibrated master clock frequency.

FIG. 5C illustrates an alternate synchronously clocked interface configuration where the sensor utilizes an externally generated clock. This system interface approach has the greatest dependence on the absolute accuracy of the external system's clock frequency fed back to the sensor.

FIGS. 6A-C illustrate an example process that shows the steps to be performed by the systems 510 of FIGS. 5A-C. It uses the data collected and communicated over the serial interface by the data acquisition portion of the circuit described in FIGS. 2 and 3. The data reduction process depicted in FIGS. 6A-C enables algorithmic correction of most scale factor errors encountered in FIGS. 5A and 5B.

The prior process determined a pressure-based parameter expressed in engineering units after each system interrogation. This could be expressed in terms or pressure, altitude, airspeed, or density for example. The additional processing steps described in FIGS. 6A-C converts these measurements into rate measurements of pressure, altitude, Mach, airspeed or other parameters as desired.

Although the sensor does not directly output a "rate" signal as a separate entity, it does output the magnitude and timing data from which an accurate and quiet rate measurement may be algorithmically reconstructed as previously illustrated in the example. If the end computational system uses a clock that is separate from that within the sensor and without the algorithmic compensation of the sensor's internal clock, its clock accuracy relative to the sensor's clock will affect the scale factor accuracy of the derived rate signal, but not its noise. The two main limitations to the accuracy of this computational approach are: 1) the accuracy with which time can be measured, typically <0.01 percent if the internal thermally modeled oscillator is utilized as the reference timebase for the system; and 2) the accuracy of the algorithm that converts the sensed parameter into engineering units. Filtering of the resultant rate parameter may be done if desired. However, this approach substantially reduces the need for filtering and the subsequent latency of the rate measurement. Typically, only the last two to three sets of measured and computed data would be stored in a circular buffer, acted upon and then be overwritten by subsequent data. Certain types of filtering algorithms may necessitate larger circular buffers.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The embodiments of the invention in which an exclusive property or privilege is claimed are defined as follows:

1. A sensor comprising:
    a sensor circuit configured to supply an analog sensor signal that varies with at least one physical parameter to which the sensor circuit is exposed;
    a clock configured to generate a timing signal;
    an output circuit configured to receive a mode select signal associated with one of a plurality of signal processing modes and the sensor signal, and to supply an output signal representative of the at least one sensed parameter based on the implemented signal processing mode, the received analog sensor signal and the timing signal.

2. The sensor of claim 1, wherein the output circuit comprises:
    a data acquisition portion configured to simultaneously perform analog to digital conversion and time-tagging of the data for each conversion.

3. The sensor of claim 2, wherein the data acquisition portion comprises an integrated synchronous data acquisition system.

4. The sensor of claim 3, wherein the clock is one of an internal or externally generated clock source.

5. The sensor of claim 4, wherein the sensor has the ability to provide a clock output for use by an external system.

6. The sensor of claim 5, wherein the clock includes an oscillator having performance modeled over temperature with calibration coefficients representing the oscillator's frequency and error versus temperature.

7. The sensor of claim 2, wherein the sensor is configurable for internal synchronous or asynchronous sigma-delta based analog to digital conversion along with synchronous data acquisition.

8. The sensor of claim 7, wherein the sensor circuit outputs high resolution serial digital raw magnitude and timing data over a standard digital bus and simultaneously outputs a synchronous pulse density modulation (PDM) analog data stream.

9. The sensor of claim 7, wherein the sensor circuit outputs high resolution serial digital raw magnitude and timing data over a standard digital bus and simultaneously outputs an asynchronous pulse density modulation (PDM) analog data stream.

10. A method for determining rate of change of a physical parameter, the method comprising:
    supplying an analog sensor signal that varies with at least one physical parameter;
    generating a timing signal;
    receiving a mode select signal and the sensor signal;
    implementing one of a plurality of signal processing modes, and operable, upon receipt of the analog sensor signal; and
    generating an output signal representative of the at least one physical parameter based on the implemented signal processing mode, the analog sensor signal and the timing signal.

11. The method of claim 10, further comprising externally generating a rate-of-change measurement of at least one physical parameter based on output of synchronized timing and magnitude data using a data reduction process.

12. The method of claim 10, wherein generating performs time-stamping of data associated with analog sensor signal.

13. The method of claim 10, wherein the at least one physical parameter includes one of temperature or pressure.

* * * * *